United States Patent [19]

Fong

[11] Patent Number: 4,795,789
[45] Date of Patent: * Jan. 3, 1989

[54] PROCESS FOR MAKING ACRYLAMIDO METHANE SULFONIC ACID POLYMERS

[75] Inventor: Dodd W. Fong, Naperville, Ill.

[73] Assignee: Nalco Chemical Company, Naperville, Ill.

[*] Notice: The portion of the term of this patent subsequent to Nov. 18, 1992 has been disclaimed.

[21] Appl. No.: 112,643

[22] Filed: Oct. 26, 1987

[51] Int. Cl.$^4$ ................................................ C08F 8/36
[52] U.S. Cl. ...................................... 525/344; 525/353
[58] Field of Search ................ 525/344, 346, 378, 353

[56] References Cited

U.S. PATENT DOCUMENTS

| Re. 28,474 | 7/1974 | Anderson et al. . | |
|---|---|---|---|
| Re. 28,576 | 10/1975 | Anderson et al. . | |
| 3,284,393 | 11/1966 | Vanderhoff et al. . | |
| 3,624,019 | 11/1971 | Anderson et al. . | |
| 3,734,873 | 5/1973 | Anderson et al. . | |
| 3,767,629 | 10/1976 | Vallino, Jr. et al. . | |
| 3,826,771 | 7/1974 | Anderson et al. . | |
| 3,915,920 | 10/1975 | Slovinsky et al. . | |
| 3,979,348 | 9/1976 | Ballweber | 524/512 |
| 3,996,180 | 12/1976 | Kane . | |
| 3,997,492 | 12/1976 | Kane et al. . | |
| 4,024,097 | 5/1977 | Slovinsky et al. . | |
| 4,604,431 | 8/1986 | Fong et al. | 525/351 |
| 4,675,359 | 6/1987 | Kadono et al. . | |

FOREIGN PATENT DOCUMENTS 0225596  3/1986  European Pat. Off. .

OTHER PUBLICATIONS

"The HLB System a Time Saving Guide to Emulsifier Selection", ICI Americas Inc., 3/80.

*Primary Examiner*—Christopher Henderson
*Attorney, Agent, or Firm*—John G. Premo; Anthony L. Cupoli; Donald G. Epple

[57] ABSTRACT

A method of introducing acrylamido methane sulfonic acid groups into acrylic acid or methacrylic acid polymers which comprises reacting the carboxylic acid groups in such polymers with from 2–100 mole % of an ammonia, formaldehyde and a water-soluble bisulfite mixture.

5 Claims, No Drawings

PROCESS FOR MAKING ACRYLAMIDO METHANE SULFONIC ACID POLYMERS

Sulfomethylacrylamide polymers in accordance with the teachings of European Publication No. 0225596 are easily prepared from acrylamide polymers, formaldehyde, and bisulfites. Primary amide groups are always present in the final products produced by this process. There are occasions where the presence of acrylamide group in the finished polymer are not desirable.

U.S. Pat. No. 4,604,431 and U.S. Pat. No. 4,675,359 teach the preparation of acrylamido sulfonic acid polymers from polyacrylic acid and amino sulfonates including amino methane sulfonic acid.

The process of this invention is the reaction of (polyacrylic acid+$NH_3$+HCHO+$HSO_3^-$) which provides a means to prepare sulfomethylacrylamide polymers without using acrylamide polymer backbone if the absence of amide groups is a desired end polymer product. The process of this invention is an improvement over these processes, in that the preformed amino methane sulfonic acid is not needed.

THE INVENTION

The invention comprises a method of introducing acrylamido methane sulfonic acid groups into acrylic acid or methacrylic acid polymers which comprises reacting the carboxylic groups in such polymers with from 2–100 mole % of an ammonia, formaldehyde and a water-soluble bisulfite mixture. This produces a finished polymer having from about 1 to 60 moles of its carboxylic groups converted to acrylamido methyl sulfonic acid groups.

THE STARTING ACRYLIC ACID OR METHACRYLIC ACID POLYMERS

These polymers are well known and may be prepared by homo- or copolymerizing either acrylic acid or methacrylic acid. When acrylic or methacrylic acids are copolymerized, they may be combined with a variety of comonomers. Illustrations of such comonomers would be acrylamide, methacrylamide, or itaconic acid. The acrylic acid or methacrylic acid polymers may also be combined with small amounts of water-insoluble monomers such as acrylonitrile, styrene, vinyl acetate, and the like. The amount should not be of such magnitude so as to render the polymers water-insoluble.

It is preferred to use as starting polymers the homopolymers of acrylic acid or methacrylic acid. While copolymers containing as little as 5 mole percent of either acrylic or methacrylic acid may be used as a starting material, it is preferred that the copolymers contain between about 20–80% of acrylic acid or methacrylic acid. These starting polymers should be water-soluble or dispersible.

The molecular weight of the starting polymers may vary from as little as 1,000 or 2,000 up to as much as several million. The molecular weight and the degree of conversion to acrylamido methyl sulphonic acid polymers will depend primarily upon the intended end use. For example, if dispersancy is required, then polymers having molecular weights less than 100,000 would be used. For flocculation applications, the molecular weight should be as high as possible, e.g. about 500,000 to as much as several million.

While the free acrylic or methacrylic acid forms of the polymers may be used, an equivalent is the utilization of their lower alkyl esters such as the methyl or ethyl acrylates, which esters hydrolyze during the course of the reactions hereafter described.

The acrylic acid or methacrylic polymers are commonly prepared by solution polymerization. The finished solution may be used as such or diluted. Dry polymers may be added to water to form the solution. An alternative form of the acrylic acid methacrylic polymers which can be reacted with the ammonia, formaldehyde or bisulfite are water-in-oil emulsions of these polymers.

THE WATER-IN-OIL EMULSIONS OF ACRYLIC ACID POLYMERS*

The water-in-oil emulsions of acrylic acid polymers useful in this invention contain four basic components. These components and their weight percentages in the emulsions are listed below:

A. Acrylic acid polymer:
 1. Generally from 5–60%;
 2. Preferably from 20–40%; and
 3. Most preferably from 25–35%;
B. Water:
 1. Generally from 20–90%;
 2. Preferably from 20–70%;
 3. Most preferably from 30–55%;
C. Hydrophobic liquid:
 1. Generally from 5–75%;
 2. Preferably from 5–40%; and
 3. Most preferably from 20–30%; and
D. Water-in-oil emulsifying agent:
 1. Generally from 0.1–21%;
 2. Preferably from 1–15%;

*Applies also to methacrylic acid polymers

It is also possible to further characterize the water-in-oil emulsions of the acrylic acid polymers with respect to the aqueous phase of the emulsions. This aqueous phase is generally defined as the sum of the polymer or copolymer present in the emulsion plus the amount of water present in the emulsion. This terminology may also be utilized in describing the water-in-oil emulsions which are useful in this invention. Utilizing this terminology, the aqueous phase of the water-in-oil emulsions of this invention generally consists of 25–95% by weight of the emulsion. Preferably, the aqueous phase is between 60–90% and most preferably from 65–85% by weight of the emulsion.

The emulsions also may be characterized in relation to the water/oil ratios. This figure is simply a ratio of the amount of water present in the emulsion divided by the amount of hydrophobic liquid present in the emulsion. Generally, the water-in-oil emulsions of this invention will have a water/oil ratio of from 0.25 to 18. Preferably, the water-in-oil ratio will range from 0.5–14, and most preferably from 1.0–2.75.

THE HYDROPHOBIC LIQUIDS

The hydrophobic liquids or oils used in preparing these emulsions may be selected from a large group of organic liquids which include liquid hydrocarbons and substituted liquid hydrocarbons.

A preferred group of organic liquids that can be utilized in the practice of this invention are paraffinic hydrocarbon oils. Examples of these types of materials include a branched-chain isoparaffinic solvent sold by Humble Oil and Refinery Company under the tradename "Isopar M" described in U.S. Pat. No. 3,624,019 and a paraffinic solvent sold by the Exxon Company, U.S.A. called "Low Odor Paraffinic Solvent". Typical specifications of this material are set forth below in Table I.

TABLE I

| | |
|---|---|
| Specific Gravity 60°/60° F. | 0.780–0.806 |
| Color Saybolt | +30 min. |
| Appearance, visual | Bright and Clear |
| Aniline Point, °F., ASTM D-611 | 160 min |
| Distillation, °F., ASTM D-86 | |
| IBP | 365 min. |
| FBP | 505 max. |
| Flash Point, °F., TCC | 140 min. |
| Sulfur, ppm, Microcoulometer | 15 max. |

While paraffinic oils are the preferred materials for use in preparing the water-in-oil emulsions of this invention, other organic liquids can be utilized. Thus, mineral oils, kerosenes, naphthas, and in certain instances petroleum may be used. While useful in this invention, solvents such as benzene, xylene, toluene, and other water immiscible hydrocarbons having low flash points or toxic properties are generally avoided due to problems associated with their handling.

THE WATER-IN-OIL EMULSIFYING AGENTS

Any conventional water-in-oil emulsifying agent can be used such as sorbitan monostearate, sorbitan monooleate, and the so-called low HLB materials which are all documented in the literature and are summarized in the Atlas HLB Surfactants Selector. Although the mentioned emulsifiers are used in producing good water-in-oil emulsions, other surfactants may be used as long as they are capable of producing these emulsions. It is also contemplated, however, that other water-in-oil emulsifying agents can be utilized.

U.S. Pat. No. 3,997,492 shows the use of emulsifiers generally having higher HLB values to produce stable emulsions similar in character to those discussed above. With the use of the equations present in this reference, which is hereinafter incorporated by reference, emulsifiers having HLB values between 4–9 can be utilized in the practice of this invention.

In addition to the reference described above, U.S. Pat. No. 4,024,097 discloses particular emulsifying agents for the water-in-oil emulsions, which are the subject of this invention. These emulsions are generally prepared according to this reference utilizing a water-in-oil emulsifying agent comprising a partially esterified lower N,N-dialkanol substituted fatty amide. Additionally, other surfactants such as polysoaps may be combined to produce emulsions having small particle sizes, excellent storage stability and high temperature stability. The emulsifying agent should be capable of keeping the latex stable at the reaction temperatures hereafter described.

THE PREPARATION OF THE WATER-IN-OIL EMULSIONS OF ACRYLIC ACID POLYMERS

The general method for the preparation of emulsions of the type described above is contained in Vanderhoff, U.S. Pat. No. 3,284,393 which is hereinafter incorporated by reference. A typical procedure for preparing water-in-oil emulsions of this type includes preparing an aqueous solution of acrylic acid or its water soluble salts and adding this solution to one of the hydrocarbon oils described above. With the addition of a suitable water-in-oil emulsifying agent and under agitation, the emulsion is then subjected to free radical polymerization conditions and a water-in-oil emulsion of the acrylic acid polymer is obtained. It should be pointed out that the ingredients are chosen based upon the weight percentages given above and their compatability with each other. As to choice of free radical catalyst, these materials may be either oil or water-soluble and may be from the grop consisting of organic peroxides, Vazo type materials, redox type initiator systems, etc. Additionally, ultraviolet light, microwaves, etc. will also cause the polymerization of water-in-oil emulsions of this type.

In the manufacture of emulsions of this type, which are further detailed in U.S. Pat. No. 3,624,019, U.S. Pat. No. RE 28,474, U.S. Pat. No. 3,734,873, U.S. Pat. No. RE 28,576, U.S. Pat. No. 3,826,771, all of which are incorporated by reference. The use of air may be employed to control polymerization. This technique is described in U.S. Pat. No. 3,767,629 which is also hereinafter incorporated by reference.

In addition to the above references, U.S. Pat. No. 3,996,180 describes the preparation of water-in-oil emulsions of the types utilized in this invention by first forming an emulsion containing small particle size droplets between the oil, water, monomer and water-in-oil emulsifying agent utilizing a high shear mixing technique followed by subjecting this emulsion to free radical polymerization conditions. Also of interest is U.S. Pat. No. 4,024,097 which describes water-in-oil emulsions such as those described above utilizing particular surfactant systems for the water-in-oil emulsifying agent, allowing for the preparation of latexes having small polymer particle sizes and improved storage stability.

Another reference, U.S. Pat. No. 3,915,920, discloses stabilizing water-in-oil emulsions of the type above described utilizing various oil-soluble polymers such as polyisobutylene. Employment of techniques of this type provides for superior stabilized emulsions.

Of stll further interest in U.S. Pat. No. 3,997,492 which describes the formation of water-in-oil emulsions of the type above described.

PHYSICAL PROPERTIES OF THE WATER-IN-OIL EMULSIONS

The water-in-oil emulsions of the acrylic acid polymers useful in this invention contain relatively large amounts of polymer. The polymers dispersed in the emulsion are quite stable when the particle size of the polymer is from the range of 0.1 microns up to about 5 microns. The preferred particle size is generally within the range of 0.2 microns to about 3 microns. A most preferred particle size is generally within the range of 0.2 to 2.0 microns.

The emulsions prepared having the above composition generally have a viscosity in the range of from 50 to 1,000 cps. It will be seen, however, that the viscosity of these emulsions can be affected greatly by increasing or decreasing the polymer content, oil content, or water content as well as the choice of a suitable water-in-oil emulsifier.

Another factor attributing to the viscosity of these types of emulsions is the particle size of the polymer which is dispersed in the continuous aqueous phase. Generally, the smaller the particle obtained the less viscous the emulsion. At any rate, it will be readily apparent to those skilled in the art as to how the viscosity of these types of materials can be altered. It will be seen that all that is important in this invention is the fact that the emulsion be somewhat fluid, ie; pumpable and is stable at the temperatures where the chemical modification of the polymer is taking place.

THE AMMONIA FORMALDEHYDE BISULFITE MIXTURE

This mixture of three compounds is prepared by adding ammonia, preferably in the form of ammonium hydroxide, formaldehyde and sodium or other water soluble bisulfites to provide an aqueous solution of the three ingredients. In one embodiment of the invention, the formaldehyde and bisulfite can be first added to water to prepare an adduct. To this adduct is then added the ammonia.

The ammonia, formaldehyde and bisulfite can be used at any ratios. It is preferred that the mole ratio of ammonia, formaldehye and the bisulfite is about 1:1:1. A molar excess of 10–30% of ammonia may also be used. The ammonia formaldehyde and bisulfite should be in sufficient quantities to provide from 2–100 mole percent per the number of moles of carboxylic acid groups present in the starting acrylic acid or methacrylic acid polymers. As indicated, the finished polymer of the invention contains from about 1 to about 60 moles of its carboxylic acid groups converted to amido methyl sulfonic groups.

THE REACTION CONDITIONS TEMPERATURE

The reaction is conducted at a temperature of at least 70° C., preferably within the range of 100°–220° C., and most preferably within the range of 120°–200° C. The reaction will usually run for 3–8 hours.

THE REACTION MEDIA AND PH

The reaction is conducted in an aqueous environment and the reactants are used as an aqueous solution thereof. A convenient method of conducting the reaction is to first prepare a solution of the starting polymer which would contain between about 5% up to as much as 50% by weight. The concentration would depend upon the viscosity of the solution, which is dictated by the molecular weight, and the degree of branching of the starting polymer. To this would be added the ammonia, formaldehyde and bisulfite, preferably as an aqueous solution. When water-in-oil emulsions are used the three reactans would be added to these emulsions directly.

The reaction is conducted in the presence of a water-soluble base such as sodium or potassium hydroxide. The corresponding carbonates can be used. In terms of pH, such may vary over a wide range, e.g. 2–12, although 2–8 is preferable.

PRESSURE

The reaction due to the volatile nature of the solvent at the temperatures of the reaction require the use of a pressurized environment. While it may be simply autogenous, it is preferably within the range of at least 1 and most preferably 5–20 atmospheres of pressure.

The time of the reaction may vary between two hours up to 15 hours although the time of the reaction is controlled by the temperature, pressure, and reactivity of the ingredients.

After the reaction has been completed, the finished product is in the form of a solution or a water-in-oil emulsion which may be converted to a solid using known techniques such as evaporation or precipitation.

To illustrate the invention, the following examples are presented in the form of the Table.

TABLE I

| | | Modification of Polyacrylic Acid | | | | |
|---|---|---|---|---|---|---|
| Examples | Polymer Type | Mole % of HCHO—NaHSO$_3$ Based on Total Polymer | Mole % of NH$_3$ Based on Total Polymer | pH of the Reaction Medium | RXN Temp. | RXN Time |
| 1 | Solution | 20 | 30 | 6 | 150 | 5 hr. |
| 2 | Solution | 20 | 30 | 6 | 150 | 7.5 hr. |
| 3 | Solution | 20 | 30 | 6 | 160 | 5 hr. |
| 4 | Solution | 20 | 20 | 2.4 | 150 | 6 hr. |
| 5 | Solution | 20 | 20 | 2.4 | 150 | 6 hr. |
| 6 | Solution | 10 | 10 | 2.4 | 150 | 6 hr. |
| 7 | Solution | 30 | 30 | 2.4 | 150 | 6 hr. |
| 8 | Solution | 40 | 40 | 2.4 | 150 | 6 hr. |
| 9 | Solution | 50 | 50 | 2.4 | 150 | 6 hr. |
| 10 | Solution | 20 | 20 | 2.4 | 150 | 6 hr. |
| 11 | Solution | 20[1] | 20 | 2.4 | 150 | 6 hr. |
| 12 | Latex | 20 | 20 | 8.5 | 150 | 3 hr. |
| 13 | Latex | 20 | 20 | 8.5 | 150 | 6 hr. |

| Examples | Final pH | Mole % SO$_3^{-4}$ Content in the Polymer | % Polymer Actives | MWT (B.Bone) | MWT (Final) |
|---|---|---|---|---|---|
| 1 | 5.7 | 6 | 13.7 | 43,800[2] | 30,500[2] |
| 2 | 6.2 | 4 | 29.0 | 4,600[2] | 4,940[2] |
| 3 | 6.2 | 4 | 29.1 | 4,600[2] | 4,830[2] |
| 4 | 3.7 | 9 | 32.7 | 71,800[2] | 51,600[2] |
| 5 | 3.8 | 11 | 33.5 | 71,800[2] | 51,800[2] |
| 6 | 3.0 | 4 | 33.6 | 71,800[2] | 53,000[2] |
| 7 | 3.6 | 12 | 31.1 | 71,800[2] | 51,300[2] |
| 8 | 4.1 | 20 | 31.5 | 71,800[2] | 52,000[2] |
| 9 | 4.4 | 23 | 30.4 | 71,800[2] | 52,600[2] |
| 10 | 3.7 | 8 | 16.2 | 1.5 RSV[3] | 0.8 RSV[3] |
| 11 | 3.7 | 9 | 31.7 | 71,800[2] | — |
| 12 | — | 11 | 18.9 | 27.5 RSV[3] | 16.3 RSV[3] |

TABLE I-continued

Modification of Polyacrylic Acid

| 13 | — | 10 | 18.7 | 27.5 RSV[3] | 14.2 RSV[3] |
|---|---|---|---|---|---|

[1] HCHO + NaHSO3 used instead of HOCH2SO3Na
[2] Determined by GPC in aqueous medium using polystyrene sulfonate standards.
[3] Reduced specific viscosity was measured at concentrations of 0.040 grams of polymer in a two normal solution of sodium nitrate.
[4] Determined by colloid titrations Using the same procedures as shown in the Table, similar results should be obtained using methacrylic acid.

From the above examples, it is evident that slight degradation of the polymers occurs due to the reaction conditions. The activity of these polymers, however, is good when tested in such applicational areas as described in U.S. Pat. No. 4,675,359.

Having thus described my invention, it claimed as follows:

1. A method of introducing acrylamino methane sulfonic acid groups into acrylic acid or methacrylic acid polymers are in the form of a water-in-oil emulsion which contain at least 5 mole % of acrylic or methacrylic acid which comprises reacting the carboxylic acid groups in such polymers with from 2-100 mole % of an ammonia, formaldehyde and a water-soluble bisulfite mixture whereby from about 1 to about 60 moles of the carboxylic acid groups in such polymers are converted to amido methane sulfonic acid groups.

2. The method of claim 1 where the reaction is conducted at a temperature of from 100°-220° C.

3. The method of claim 1 where the acrylic or methacrylic acid polymers are homopolymers.

4. The method of claim 1 where the acrylic or methacrylic acid polymers contain from 20-80 mole percent of acrylic or methacrylic acid.

5. The method of claim 1 where the polymer is an acrylic acid polymer.

* * * * *